(12) United States Patent
Gready et al.

(10) Patent No.: US 10,817,999 B2
(45) Date of Patent: Oct. 27, 2020

(54) IMAGE-BASED OVERLAY METROLOGY AND MONITORING USING THROUGH-FOCUS IMAGING

(71) Applicant: KLA-Tencor Corporation, Milpitas, CA (US)

(72) Inventors: David Gready, Tel Aviv (IL); Nimrod Shuall, Beaverton, OR (US); Claire Staniunas, Forest Grove, OR (US)

(73) Assignee: KLA Corporation, Milpitas, CA (US)

( * ) Notice: Subject to any disclaimer, the term of this patent is extended or adjusted under 35 U.S.C. 154(b) by 161 days.

(21) Appl. No.: 16/034,093

(22) Filed: Jul. 12, 2018

(65) Prior Publication Data

US 2019/0026885 A1 Jan. 24, 2019

Related U.S. Application Data

(60) Provisional application No. 62/533,763, filed on Jul. 18, 2017.

(51) Int. Cl.
*G06T 7/00* (2017.01)
*G06T 7/68* (2017.01)
*G05B 13/02* (2006.01)

(52) U.S. Cl.
CPC .......... *G06T 7/0004* (2013.01); *G05B 13/024* (2013.01); *G06T 7/001* (2013.01); *G06T 7/68* (2017.01); *G06T 2207/30148* (2013.01)

(58) Field of Classification Search
CPC ......... G06T 7/0004; G06T 7/68; G06T 7/001; G06T 2207/30148; G05B 13/024
USPC ........................................................ 382/151
See application file for complete search history.

(56) References Cited

U.S. PATENT DOCUMENTS

| 6,429,943 | B1 | 8/2002 | Opsal et al. |
| 6,463,184 | B1 * | 10/2002 | Gould ................. G03F 7/70633 382/151 |
| 6,919,957 | B2 * | 7/2005 | Nikoonahad ....... G03F 7/70625 250/559.42 |
| 6,985,618 | B2 | 1/2006 | Adel et al. |
| 7,106,425 | B1 * | 9/2006 | Bultman .............. G01N 21/211 356/237.2 |
| 7,478,019 | B2 | 1/2009 | Zangooie et al. |

(Continued)

OTHER PUBLICATIONS

International Search Report and Written Opinion dated Nov. 1, 2018 for PCT/US2018/042627.

*Primary Examiner* — Juan A Torres
(74) *Attorney, Agent, or Firm* — Suiter Swantz pc llo

(57) ABSTRACT

A metrology system includes a controller coupled to a detector to image a sample based on the light captured by an objective lens, where an object plane of the detector with respect to the sample is adjustable. The controller may direct the detector to generate reference images of an overlay target on the sample at multiple object planes including at least a first reference image at a first sample layer and a second reference image at a second sample layer. The controller may further determine a reference overlay between the first layer and the second layer at the overlay target based on the first reference image and the second reference image. The controller may further select a measurement object plane for single-image overlay determination that corresponds to the reference overlay within a selected tolerance. The controller may further determine overlay for additional overlay targets at the measurement plane.

25 Claims, 5 Drawing Sheets

(56) References Cited

U.S. PATENT DOCUMENTS

| | | | |
|---|---|---|---|
| 8,126,258 B2 * | 2/2012 | Yang | G06T 7/001 |
| | | | 348/125 |
| 8,179,530 B2 * | 5/2012 | Levy | G01N 21/211 |
| | | | 356/401 |
| 8,836,943 B2 * | 9/2014 | Ahn | G01B 11/02 |
| | | | 356/400 |
| 9,291,554 B2 | 3/2016 | Kuznetsov et al. | |
| 2004/0257571 A1 * | 12/2004 | Mieher | G01N 21/956 |
| | | | 356/401 |
| 2005/0122516 A1 | 6/2005 | Sezginer et al. | |
| 2013/0155406 A1 | 6/2013 | Den Boef | |
| 2014/0172394 A1 | 6/2014 | Kuznetsov et al. | |
| 2016/0047744 A1 * | 2/2016 | Adel | G03F 7/70633 |
| | | | 356/401 |
| 2016/0291481 A1 | 10/2016 | Smilde et al. | |
| 2016/0300767 A1 | 10/2016 | Ko et al. | |
| 2016/0334716 A1 | 11/2016 | Mieher | |
| 2017/0052458 A1 * | 2/2017 | Tang | G03F 7/70633 |

\* cited by examiner

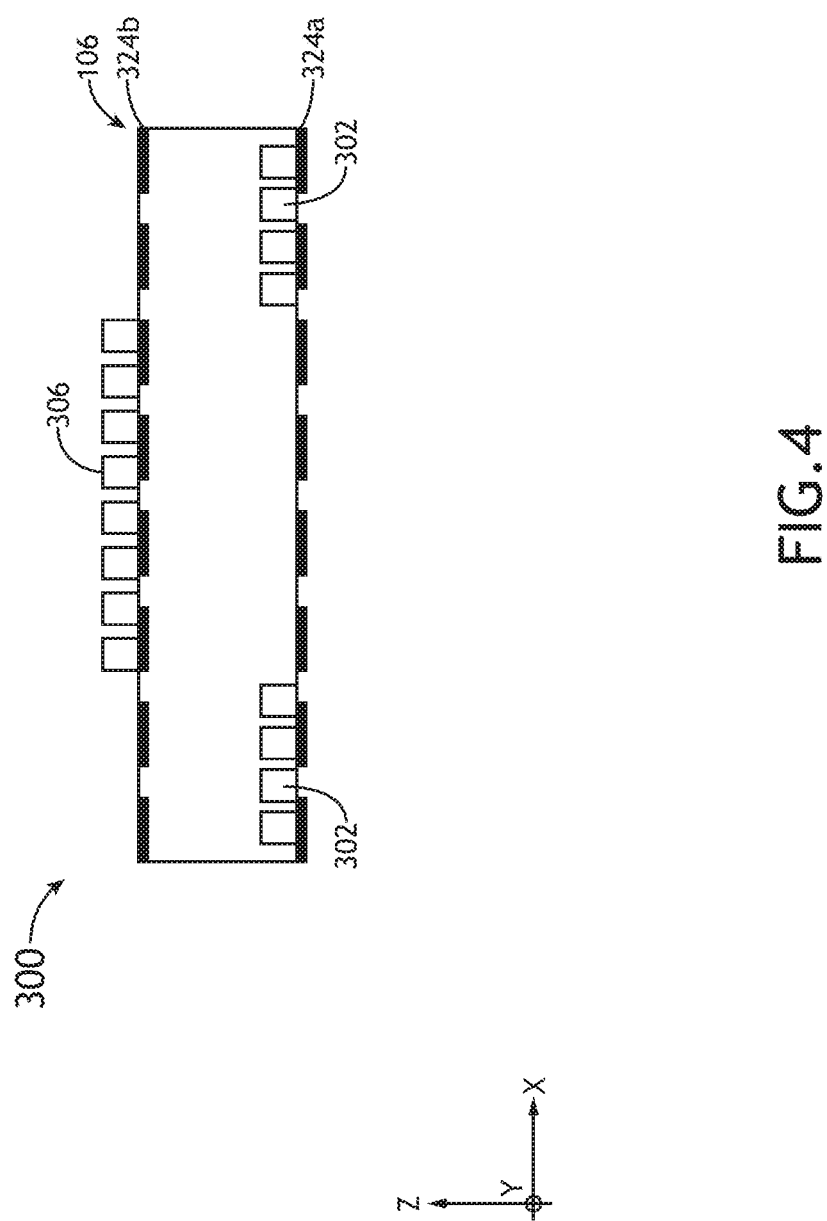

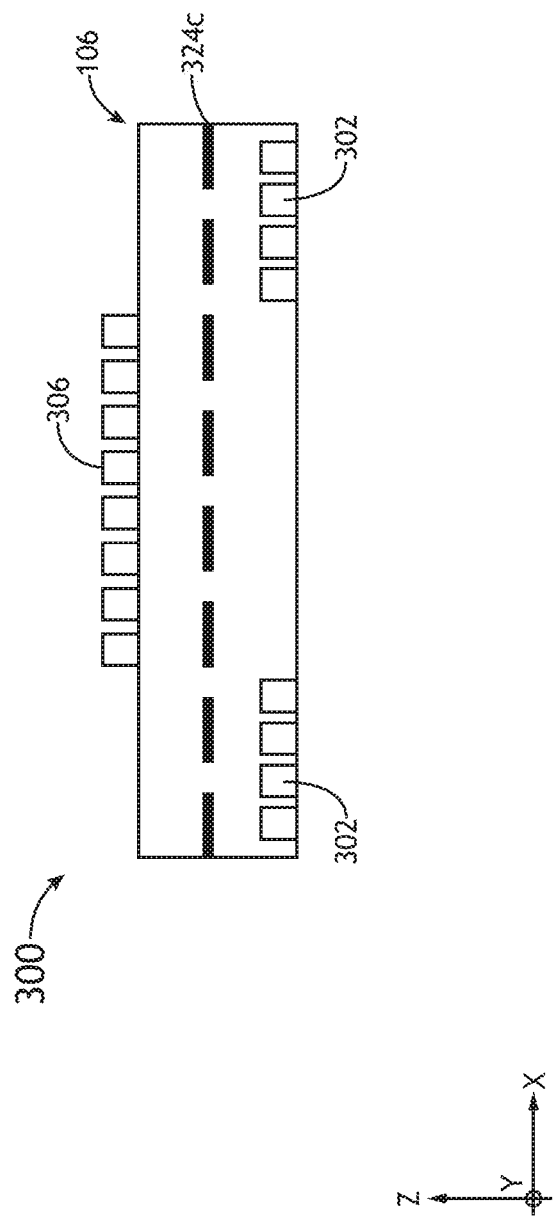

IMAGE-BASED OVERLAY METROLOGY AND MONITORING USING THROUGH-FOCUS IMAGING

CROSS-REFERENCE TO RELATED APPLICATION

The present application claims the benefit under 35 U.S.C. § 119(e) of U.S. Provisional Application Ser. No. 62/533,763 filed Jul. 18, 2017, entitled METHOD FOR CLASSIFYING AND MONITORING ACCURATE IMAGING BASED OVERLAY MEASUREMENT BASED ON THROUGH FOCUS MEASUREMENT, which is incorporated herein by reference in the entirety.

TECHNICAL FIELD

The present disclosure relates generally to overlay metrology and, more particularly, to calibrating image-based metrology using through-focus images.

BACKGROUND

Image-based overlay metrology may typically include determining relative offsets between two or more layers on a sample based on relative imaged positions of features of an overlay target in the different layers of interest. The accuracy of the overlay measurement may thus be sensitive to image quality associated with imaged features on each sample layer, which may vary based on factors such as a depth of field or location of the plane (e.g., focal plane) with respect to the sample. Accordingly, overlay metrology procedures typically include tradeoffs between image quality at particular sample layers and throughput. For example, it may be the case that overlay measurements based on separate images of each sample layer may provide the highest quality images of overlay target features. However, capturing multiple images per target may reduce throughput. By way of another example, overlay measurements based on a single image capturing features on multiple layers may provide relatively higher throughput, but may require reference measurements based on external tools or full-wafer measurements to provide a desired measurement accuracy. Therefore, it would be desirable to provide a system and method for curing defects such as those identified above.

SUMMARY

A metrology system is disclosed in accordance with one or more embodiments of the present disclosure. In one illustrative embodiment, the system includes a controller coupled to a detector configured to generate images of a sample based on the light captured by an objective lens, where an object plane of the detector with respect to the sample is adjustable. In another illustrative embodiment, the controller directs the detector to generate reference images of an overlay target on the sample at multiple object planes including at least a first reference image at a first layer of the sample and a second reference image at a second layer of the sample. In another illustrative embodiment, the controller determines a reference overlay between the first layer and the second layer at the overlay target based on at least the first reference image and the second reference image. In another illustrative embodiment, the controller selects a measurement object plane for single-image overlay determination, where overlay between the first layer and the second layer determined at the measurement plane corresponds to the reference overlay within a selected tolerance. In another illustrative embodiment, the controller directs the detector to generate at least one measurement image of at least one additional overlay target on the sample at the measurement plane. In another illustrative embodiment, the controller determines at least one measured overlay between the first layer and the second layer at the at least one additional overlay target based on the at least one measurement image.

A metrology system is disclosed in accordance with one or more illustrative embodiments of the present disclosure. In one illustrative embodiment, the system includes an illumination source configured to generate an illumination beam. In another illustrative embodiment, the system includes an objective lens configured to direct the illumination beam to a sample and further configured to capture light from the sample in response to the illumination beam. In another illustrative embodiment, the system includes a detector configured to generate images of the sample based on the light captured by the objective lens, wherein an object plane of the detector with respect to the sample is adjustable. In another illustrative embodiment, the system includes a controller communicatively coupled to the detector. In another illustrative embodiment, the controller directs the detector to generate reference images of an overlay target on the sample at multiple object planes including at least a first reference image at a first layer of the sample and a second reference image at a second layer of the sample. In another illustrative embodiment, the controller determines a reference overlay between the first layer and the second layer at the overlay target based on at least the first reference image and the second reference image. In another illustrative embodiment, the controller selects a measurement object plane for single-image overlay determination, where overlay between the first layer and the second layer determined at the measurement plane corresponds to the reference overlay within a selected tolerance. In another illustrative embodiment, the controller directs the detector to generate at least one measurement image of at least one additional overlay target on the sample at the measurement plane. In another illustrative embodiment, the controller determines at least one measured overlay between the first layer and the second layer at the at least one additional overlay target based on the at least one measurement image.

A method for measuring overlay is disclosed in accordance with one or more illustrative embodiments of the present disclosure. In one illustrative embodiment, the method includes generating a plurality of reference images of an overlay target on a sample at a plurality of object planes, where the plurality of reference images include reference images corresponding to locations of overlay target features on two or more layers of the sample. In another illustrative embodiment, the method includes determining a reference overlay between the two or more layers of the sample based on the plurality of reference images. In another illustrative embodiment, the method includes selecting a measurement object plane for single-image overlay determination, wherein overlay between the two or more layers of the sample corresponds to the reference overlay within a selected tolerance. In another illustrative embodiment, the method includes generating at least one measurement image of at least one additional overlay target on the sample at the measurement plane. In another illustrative embodiment, the method includes determining at least one measured overlay between the two or more layers of the sample at the at least one additional overlay target based on the at least one measurement image.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 4 is a side view of the overlay metrology target of FIG. 3 indicating multiple object planes located at different depths in a sample 106, in accordance with one or more embodiments of the present disclosure.

FIG. 5 is a side view of an overlay metrology target indicating a measurement object plane suitable for single-image overlay measurements, in accordance with one or more embodiments of the present disclosure.

DETAILED DESCRIPTION

Figure 1:
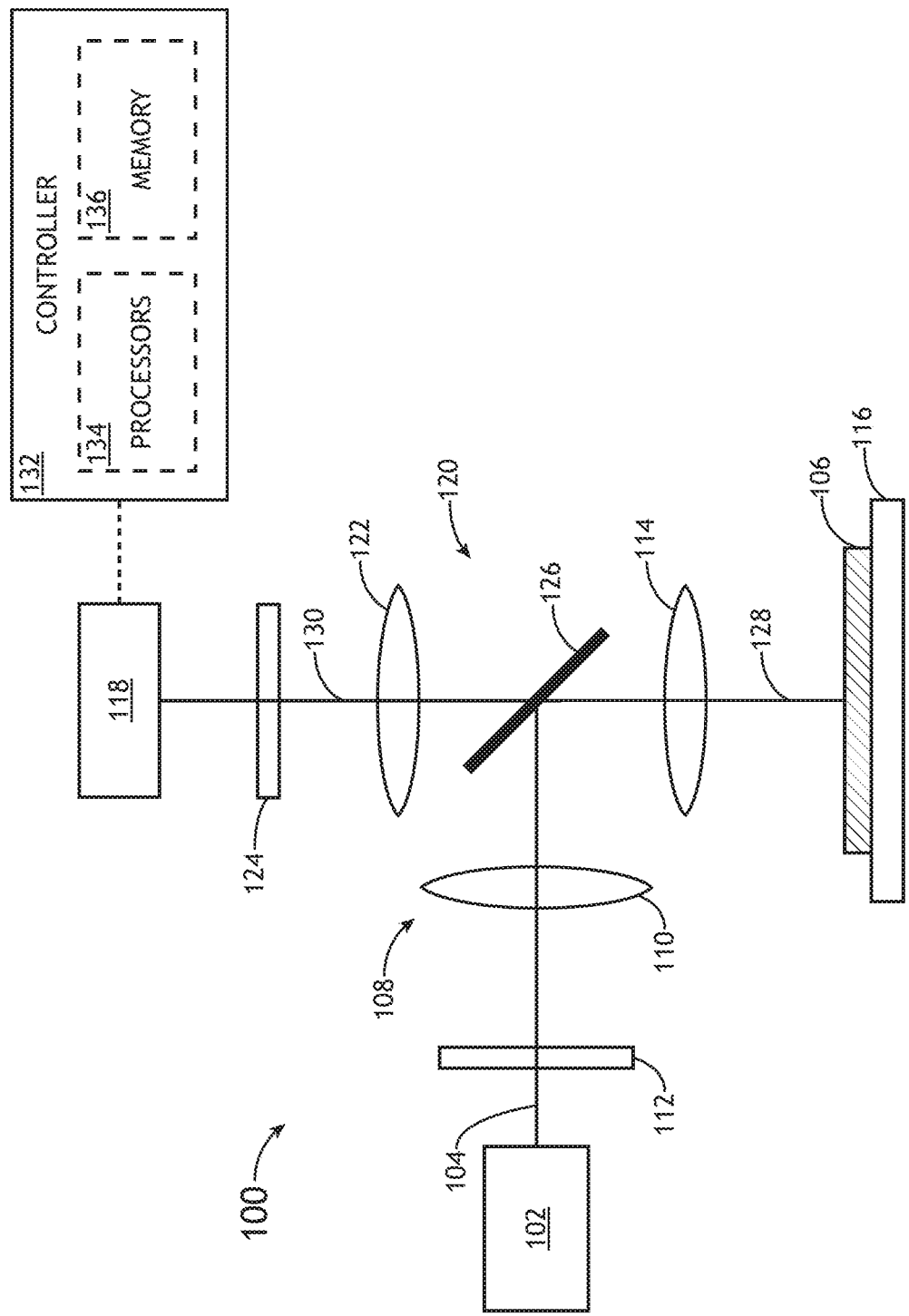
FIG. 1 is a conceptual view illustrating an image-based overlay metrology system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods through-focus imaging of an overlay target on a sample to provide self-referenced overlay measurement recipes for additional overlay targets on the sample as well as process-monitoring between wafers.

Semiconductor devices are typically formed as multiple patterned layers of patterned material on a substrate. Each patterned layer may be fabricated through a series of process steps such as, but not limited to, one or more material deposition steps, one or more lithography steps, or one or more etching steps. Further, features within each patterned layer must typically be fabricated within selected tolerances to properly construct the final device. For example, overlay errors associated with relative misregistrations of features on different sample layers must be well characterized and controlled within each layer and relative to previously fabricated layers.

Accordingly, overlay targets may be fabricated on one or more sample layers to enable efficient characterization of the overlay of features between the layers. For example, an overlay target may include fabricated features on multiple layers arranged to facilitate accurate overlay measurements. In this regard, overlay measurements on one or more overlay targets distributed across a sample may be used to determine the overlay of corresponding device features associated with a semiconductor device being fabricated.

Image-based overlay metrology tools typically capture one or more images of an overlay target and determine an overlay between sample layers based on relative positions of imaged features of the overlay target on layers of interest. For example, features of overlay targets suitable for image-based overlay (e.g., box-in-box targets, advanced imaging metrology (AIM) targets, or the like) located on different sample layers may be, but are not required to be, arranged such that features on all layers of interest are simultaneously visible. In this regard, the overlay may be determined based on relative positions of features on layers of interest within one or more images of the overlay target. Further, overlay targets may be designed to facilitate overlay measurements between any number of sample layers in either a single measurement step or multiple measurement steps. For instance, features within any number of sample layers may be simultaneously visible for a single-measurement overlay determination between all sample layers. In another instance, an overlay target may have different sections (e.g., cells, or the like) to facilitate overlay measurements between selected layers. In this regard, overlay between all layers of interest may be determined based on measurements of multiple portions of the overlay target.

The accuracy of image-based overlay may depend on multiple factors associated with image quality such as, but not limited to, resolution or aberrations. For example, the system resolution may impact the accuracy at which positions of features may be determined (e.g., edge positions, centers of symmetry, or the like). By way of another example, aberrations in an imaging system may distort the sizes, shapes, and spacings of features such that position measurements based on an image may not accurately represent the physical sample.

Further, image quality may vary as a function of focal depth. For example, features outside of a focal volume of an imaging system may appear blurred and/or may have a lower contrast between overlay target features and background space than features within the focal volume, which may impact the accuracy of positional measurements (e.g., edge measurements, or the like). By way of another example, aberrations of an imaging system typically vary as a function of imaging conditions such as, but not limited to, refractive indices of one or more materials between an imaging lens and the focal plane, a number of material interfaces between the imaging lens and the focal plane, or focal depth. Accordingly, imaging systems may typically be calibrated to provide aberration-corrected images under selected conditions (e.g., a selected focal plane or range of focal planes in samples having known refractive indices). In this regard, features outside of these selected conditions may be distorted by aberrations.

Additional embodiments of the present disclosure are directed to a telecentric image-based overlay metrology system. In this regard, the image-based overlay metrology system may provide a constant magnification over a range of focal positions such that sizes of imaged features may remain constant regardless of depth in a sample. However, it may be the case that a telecentric imaging system may still be subject to aberrations that vary as a function of depth.

Accordingly, it may be the case that capturing separate images of features on different layers of a sample (e.g., located at different depths in the sample) may provide accurate overlay metrology measurements. For example, a focal plane (e.g., an object plane) of an image-based overlay metrology system may be adjusted to correspond to the depth of imaged features on each layer of interest. In this regard, features on each layer of interest may be imaged under conditions designed to mitigate depth-dependent effects.

However, it is recognized herein that capturing multiple images of an overlay target at varying depths may negatively impact the throughput of the system, which may offset any gains in accuracy associated with the multiple images. Additional embodiments of the present disclosure are directed to overlay measurements based on a single image of an overlay target at a focal depth selected to maximize measurement accuracy. For example, a reference overlay measurement may be generated on an overlay target based on multiple images captured at multiple focal planes (e.g., including focal depths corresponding to locations of overlay target features). Further, a measurement focal plane may be selected such that overlay measured using a single image at the measurement focal plane may correspond to the reference overlay measurement within a selected tolerance. In this regard, the measurement focal plane may be selected to maximize the measurement accuracy based on the multi-image reference overlay measurement. Single-image overlay measurements based on images at the measurement focal plane may then be performed at any number of overlay targets across a sample.

It is recognized herein that performing a multi-image reference overlay measurement followed by numerous single-image overlay measurements at a measurement plane selected to correspond to the reference overlay measurement may provide both high measurement accuracy and high throughput. For example, it may be the case that an optimal measurement plane (e.g., a measurement plane providing a measurement accuracy comparable to a multi-image measurement within a selected tolerance) may not correspond to a measurement plane selected by alternative techniques such as, but not limited to, equalizing distances between layers of interest, or maximizing contrast of one or more features. For instance, it may be the case that an optimal measurement plane depends on specific features of the sample and/or overlay target such that accurate overlay measurements may be obtained based on tradeoffs between depth-dependent error sources including, but not limited to, image contrast, resolution, or aberrations.

It is noted that the terms "optimal," "optimize," "maximize," "minimize" and the like are used within the present disclosure to signify selections of values to achieve a desired objective within selected constraints. Accordingly, optimization, maximization, minimization, or the like need not require achieving a single "best" value. Rather, optimization may provide an acceptable value signifying performance within selected tolerances. Further, optimization, maximization, minimization, or the like may incorporate weighted selection in which one or more values are optimized to the extent that additional values remain within defined bounds. For example, optimization of the measurement plane may include selecting a measurement plane location that provides an overlay measurement as close as possible to the reference overlay measurement to the extent that other image quality metrics (e.g., image contrast, aberrations of out of plane features, or the like) are maintained within defined bounds.

Further, selecting the measurement plane based on a multi-image reference overlay measurement of a selected overlay target using a common image-based overlay metrology system may provide self-referenced overlay measurements without the need for external tools to reference or otherwise calibrate the single-image overlay measurements (e.g., a critical dimension scanning electron microscopy (CD-SEM) tool, a full-wafer measurement and modeling tool, or the like), which may further facilitate high throughput.

Additional embodiments of the present disclosure are directed to calibrating single-image overlay measurements generated at one or more locations across a sample based on the multi-image reference overlay measurement. For example, it may be the case that a single-image overlay measurement taken at a selected measurement plane may have a systematic error with respect to the multi-image reference overlay measurement. In this regard, single-image overlay measurements taken at the reference plane may be corrected based on the known systematic error.

Additional embodiments of the present disclosure are directed to generating overlay correctables based on the overlay measurements across the sample provided to fabrication tools (e.g., lithography tools, metrology tools, or the like) as feedback and/or feedforward data. Further embodiments of the present disclosure are directed to generating overlay metrology recipes based on a selected overlay measurement plane.

Additional embodiments of the present disclosure are directed to monitoring process variations across a sample or between samples. For example, systematic location-dependent variations of measured overlay may be indicative of intra-sample process variations. By way of another example, deviations of the optimal measurement plane between samples may be indicative of sample-to-sample process variations.

FIG. 1 is a conceptual view illustrating an image-based overlay metrology system 100, in accordance with one or more embodiments of the present disclosure.

In one embodiment, the overlay metrology system 100 includes an illumination source 102 to generate an illumination beam 104. The illumination beam 104 may include one or more selected wavelengths of light including, but not limited to, vacuum ultraviolet radiation (VUV), deep ultraviolet radiation (DUV), ultraviolet (UV) radiation, visible radiation, or infrared (IR) radiation. In another embodiment, the illumination source 102 directs the illumination beam 104 to a sample 106 via an illumination pathway 108. The illumination pathway 108 may include one or more illumination lenses 110 or additional illumination optical components 112 suitable for modifying and/or conditioning the illumination beam 104. For example, the one or more illumination optical components 112 may include, but are not limited to, one or more polarizers, one or more filters, one or more beam splitters, one or more diffusers, one or more homogenizers, one or more apodizers, or one or more beam shapers. By way of another example, the one or more illumination optical components 112 may include aperture stops to control the angle of illumination on the sample 106 and/or field stops to control the spatial extent of illumination on the sample 106. In another embodiment, the overlay metrology system 100 includes an objective lens 114 to focus the illumination beam 104 onto the sample 106. In one instance, the illumination pathway 108 includes an aperture stop located at a plane conjugate to the back focal plane of the objective lens 114 to provide telecentric illumination of the sample 106.

In another embodiment, the sample 106 is disposed on a sample stage 116. The sample stage 116 may include any device suitable for positioning the sample 106 within the overlay metrology system 100. For example, the sample stage 116 may include any combination of linear translation stages, rotational stages, tip/tilt stages or the like.

In another embodiment, the overlay metrology system 100 includes a detector 118 configured to capture radiation emanating from the sample 106 through a collection pathway 120. For example, the collection pathway 120 may include, but is not required to include, a collection lens (e.g. the objective lens 114 as illustrated in FIG. 1) or one or more additional collection pathway lenses 122. By way of another example, a detector 118 may receive radiation reflected or scattered (e.g. via specular reflection, diffuse reflection, and the like) from the sample 106. By way of another example, a detector 118 may receive radiation generated by the sample 106 (e.g. luminescence associated with absorption of the illumination beam 104, or the like).

The detector 118 may include any type of optical detector known in the art suitable for measuring illumination received from the sample 106. For example, a detector 118 may include, but is not limited to, a charge-coupled device (CCD) detector, a time-delay integration (TDI) detector, a photomultiplier tube (PMT), an avalanche photodiode (APD), or the like. In another embodiment, a detector 118 may include a spectroscopic detector suitable for identifying wavelengths of radiation emanating from the sample 106. In another embodiment, the overlay metrology system 100 may include multiple detectors 118 (e.g. associated with multiple beam paths generated by one or more beamsplitters to facilitate multiple metrology measurements (e.g. multiple metrology tools) by the overlay metrology system 100).

The collection pathway 120 may further include any number of collection optical elements 124 to direct and/or modify illumination collected by the objective lens 114 including, but not limited to, one or more filters, one or more polarizers, or one or more beam blocks. Additionally, the collection optical elements 124 may include field stops to control the spatial extent of the sample 106 imaged onto the detector 118 or aperture stops to control the angular extent of illumination from the sample 106 used to generate an image on the detector 118. In another embodiment, the collection pathway 120 includes an aperture stop located in a plane conjugate to the back focal plane of an optical element the objective lens 114 to provide telecentric imaging of the sample 106.

In one embodiment, as illustrated in FIG. 1, the overlay metrology system 100 includes a beamsplitter 126 oriented such that the objective lens 114 may simultaneously direct the illumination beam 104 to the sample 106 and collect light emanating from the sample 106.

In another embodiment, the angle of incidence of the illumination beam 104 on the sample 106 is adjustable. For example, the path of the illumination beam 104 through the beamsplitter 126 and the objective lens 114 may be adjusted to control the angle of incidence of the illumination beam 104 on the sample 106. In this regard, the illumination beam 104 may have a nominal path through the beamsplitter 126 and the objective lens 114 at which the illumination beam 104 has a normal incidence angle on the sample 106. By way of another example, the angle of incidence of the illumination beam 104 on the sample 106 may be controlled by modifying the position and/or angle of the illumination beam 104 on the beamsplitter 126 (e.g. by rotatable mirrors, a spatial light modulator, a free-form illumination source, or the like). In another embodiment, the illumination source 102 directs the illumination beam 104 to the sample 106 at an angle (e.g. a glancing angle, a 45-degree angle, or the like). In another embodiment, the illumination pathway 108 and the collection pathway 120 are separate. For example, the illumination pathway 108 may direct the illumination beam 104 to the sample 106 at an angle (e.g. a glancing angle, a 45-degree angle, or the like) and the collection pathway 120 may collect light from the sample 106 to generate an image of the sample 106 on the detector 118.

The overlay metrology system 100 may image the sample 106 using any imaging technique known in the art such as, but not limited to, bright-field imaging, dark-field imaging, phase-contrast imaging, differential interference contrast imaging, or the like. Accordingly, the illumination optical components 112 and/or the collection optical elements 124 may include elements suitable for manipulating the illumination beam 104 and/or the collected light to image the sample 106 using a selected imaging technique. For example, the illumination optical components 112 and/or the collection optical elements 124 may include elements such as, but not limited to, apertures, filters, or phase masks at pupil planes (e.g., illumination pupil planes or collection pupil planes) to modify the intensity and/or phase of the illumination beam 104 and/or the collected light to image the sample 106 using a selected imaging technique.

The overlay metrology system 100 may image the sample 106 at any selected measurement plane. For example, a location of an object plane associated with an image generated on the detector 118 with respect to the sample 106 may be adjusted using any combination of components of the overlay metrology system 100. For example, the location of the object plane associated with an image generated on the detector 118 with respect to the sample 106 may be adjusted by controlling a position of the sample stage 116 with respect to the objective lens 114. By way of another example, the location of the object plane associated with an image generated on the detector 118 with respect to the sample 106 may be adjusted by controlling a position of the objective lens 114 with respect to the sample 106. For instance, the objective lens 114 may be mounted on a translation stage configured to adjust a position of the objective lens 114 along the direction of the illumination optical axis 128. By way of another example, the location of the object plane associated with an image generated on the detector 118 with respect to the sample 106 may be adjusted by controlling a position of the detector 118. For instance, the detector 118 may be mounted on a translation stage configured to adjust a position of the detector 118 along the direction of the imaging optical axis 130. By way of another example, the location of the object plane associated with an image generated on the detector 118 with respect to the sample 106 may be adjusted by controlling a position of one or more collection pathway lenses 122. For instance, one or more collection pathway lenses 122 may be mounted on translation stages configured to adjust positions of the of the one or more collection pathway lenses 122 along the direction of the imaging optical axis 130.

In another embodiment, the overlay metrology system 100 includes a controller 132. In another embodiment, the controller 132 includes one or more processors 134 configured to execute program instructions maintained on a memory medium 136. In this regard, the one or more processors 134 of controller 132 may execute any of the various process steps described throughout the present disclosure. Further, the controller 132 may be configured to receive data including, but not limited to, metrology data (e.g. images of the sample 106 from the detector 118, overlay metrology data, or the like).

The one or more processors 134 of a controller 132 may include any processing element known in the art. In this sense, the one or more processors 134 may include any microprocessor-type device configured to execute algorithms and/or instructions. In one embodiment, the one or more processors 134 may consist of a desktop computer, mainframe computer system, workstation, image computer, parallel processor, or any other computer system (e.g., networked computer) configured to execute a program configured to operate the overlay metrology system 100, as described throughout the present disclosure. It is further recognized that the term "processor" may be broadly defined to encompass any device having one or more processing elements, which execute program instructions from a non-transitory memory medium 136. Further, the steps described throughout the present disclosure may be carried out by a single controller 132 or, alternatively, multiple controllers. Additionally, the controller 132 may include one or more controllers housed in a common housing or within multiple housings. In this way, any controller or combination of controllers may be separately packaged as a module suitable for integration into overlay metrology system 100. Further, the controller 132 may analyze data received from the detector 118 and feed the data to additional components within the overlay metrology system 100 or external to the overlay metrology system 100.

The memory medium 136 may include any storage medium known in the art suitable for storing program instructions executable by the associated one or more processors 134. For example, the memory medium 136 may include a non-transitory memory medium. By way of another example, the memory medium 136 may include, but is not limited to, a read-only memory (ROM), a random-access memory (RAM), a magnetic or optical memory device (e.g., disk), a magnetic tape, a solid-state drive, or the like. It is further noted that memory medium 136 may be housed in a common controller housing with the one or more processors 134. In one embodiment, the memory medium 136 may be located remotely with respect to the physical location of the one or more processors 134 and controller 132. For instance, the one or more processors 134 of controller 132 may access a remote memory (e.g., server), accessible through a network (e.g., internet, intranet and the like). Therefore, the above description should not be interpreted as a limitation on the present invention but merely an illustration.

In another embodiment, the controller 132 is communicatively coupled to one or more elements of the overlay metrology system 100 to provide layer-specific metrology configuration information. For example, the controller 132 may be, but is not required to be, communicatively coupled to one or more components of the overlay metrology system 100 for controlling the measurement plane with respect to the sample 106 (e.g., the location of the object plane associated with an image generated on the detector 118 with respect to the sample 106). For instance, the controller 132 may be communicatively coupled to the sample stage 116, the objective lens 114, the detector 118, one or more collection pathway lenses 122, or the like to control the location of an overlay measurement plane with respect to the sample 106. By way of another example, the controller 132 may be communicatively coupled to illumination optical components 112 and/or collection optical elements 124 to manipulate the illumination beam 104 and/or the collected light to image the sample 106 according to any selected imaging technique.

Further, the overlay metrology system 100 may include a single metrology tool or multiple metrology tools. A metrology system incorporating multiple metrology tools is generally described in U.S. Pat. No. 7,478,019. The use of high-numerical-aperture tools with simultaneous multiple angle-of-incidence illumination is generally described by U.S. Pat. No. 6,429,943, which is incorporated herein by reference in its entirety. Quantifying imaging performance in high NA optical lithography is generally described in Lee, et al., "Quantifying imaging performance bounds of extreme dipole illumination in high NA optical lithography", Proc. of SPIE Vol. 9985 99850X-1 (2016), which is incorporated herein by reference in its entirety. For example, the overlay metrology system 100 may include one or more image-based metrology tools such as, but not limited to, the imaging-based tool illustrated in FIG. 1, and may further include one or more additional metrology tools including, but not limited to, a spectroscopic ellipsometer with one or more angles of illumination, a spectroscopic ellipsometer for measuring Mueller matrix elements (e.g. using rotating compensators), a single-wavelength ellipsometer, an angle-resolved ellipsometer (e.g. a beam-profile ellipsometer), a spectroscopic reflectometer, a single-wavelength reflectometer, an angle-resolved reflectometer (e.g. a beam-profile reflectometer), an imaging system, a pupil imaging system, a spectral imaging system, or a scatterometer.

Figure 2:
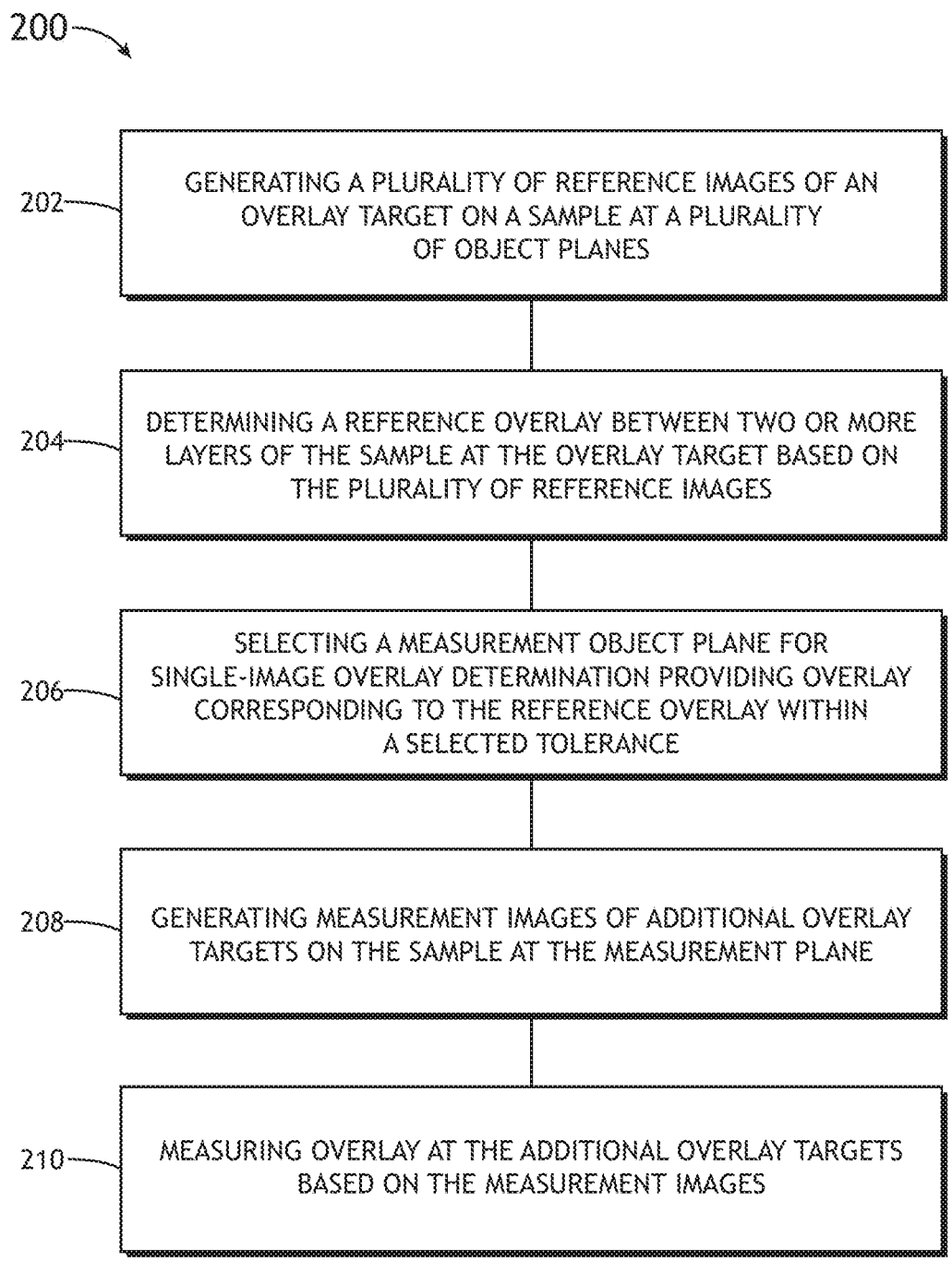
FIG. 2 is a flow diagram illustrating steps performed in a method for measuring overlay, in accordance with one or more embodiments of the present disclosure.

FIG. 2 is a flow diagram illustrating steps performed in a method 200 for measuring overlay, in accordance with one or more embodiments of the present disclosure. Applicant notes that the embodiments and enabling technologies described previously herein in the context of overlay metrology system 100 should be interpreted to extend to method 200. It is further noted, however, that the method 200 is not limited to the architecture of overlay metrology system 100.

In one embodiment, the method 200 includes a step 202 of generating a plurality of reference images of an overlay target on a sample at a plurality of object planes. For example, the plurality of reference images may include at least a first reference image at a first object plane corresponding to a location of overlay target features on a first layer of the sample and a second reference image at a second object plane corresponding to a location of overlay target features on a second layer of the sample.

Overlay metrology targets suitable for the method 200 and/or the overlay metrology system 100 may include any distribution of fabricated features on sample layers of interest known in the art suitable for image-based overlay metrology. For example, features of overlay metrology targets may be, but are not required to be, arranged such that features on all layers of interest are simultaneously visible in an image (e.g., an image captured by the detector 118 of overlay metrology system 100, or the like). In this regard, the overlay may be determined based on relative positions of features on layers of interest within one or more images of the overlay target.

Overlay metrology targets may further possess various spatial characteristics and are typically constructed of one or more cells which may include features in one or more layers which may have been printed in one or more lithographically distinct exposures. The targets or the cells may possess various symmetries such as two-fold or four-fold rotation symmetry, reflection symmetry. Examples of such metrology structures are described in U.S. Pat. No. 6,985,618, which is included herein by reference in its entirety. Different cells or combinations of cells may belong to distinct layers or exposure steps.

Overlay metrology targets may further include either isolated non-periodic features or alternately they may be constructed from one, two or three dimensional periodic structures or combinations of non-periodic and periodic structures. The use of a metrology tool to characterize non-periodic targets is generally described in U.S. Pat. No. 9,291,554, granted on Mar. 22, 2016, which is incorporated herein by reference in its entirety. Periodic structures may be non-segmented or they may be constructed from finely segmented features which may at or close to the minimum design rule of the lithographic process used to print them. Exemplary image-based overlay metrology target designs include, but are not limited to, advanced imaging metrology (AIM) targets including periodic features in different cells. Further, different cells may be designed to facilitate overlay measurements along different directions or between different combinations of sample layers.

Figure 3:
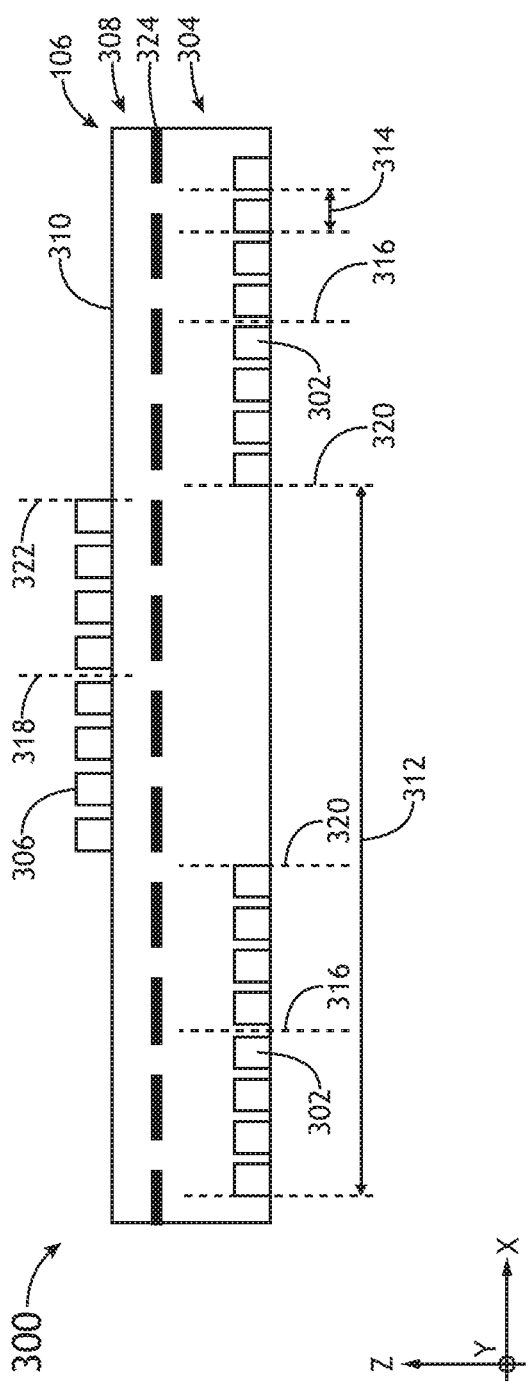
FIG. 3 is a profile view of an overlay metrology target including overlay target features on two sample layers, in accordance with one or more embodiments of the present disclosure.

FIG. 3 is a profile view of an overlay metrology target 300 including overlay target features on two sample layers, in accordance with one or more embodiments of the present disclosure. However, it is to be understood that the illustrations and associated descriptions of an overlay metrology target including overlay target features on two sample layers is provided solely for illustrative purposes and should not be interpreted as limiting. Accordingly, it is to be further understood that the figures and the associated descriptions may be extended to overlay targets with overlay target features on three or more sample layers.

In one embodiment, the overlay metrology target 300 includes first-layer target features 302 on a first layer 304 of a sample 106 and second-layer target features 306 on a second layer 308 of the sample 106. For example, the first layer 304 may comprise a sub-surface layer (e.g., a layer of beneath a surface 310 of the sample 106 at a given fabrication step at which an overlay measurement is performed).

Target features of the overlay metrology target 300 may be distributed in any pattern suitable for measuring the overlay between the first layer 304 and the second layer 308 based on imaged positions of the first-layer target features 302 and the second-layer target features 306. For example, as illustrated in FIG. 3, each layer may include a periodic distribution of features separated along a measurement direction (e.g., an X direction of FIG. 3). For instance, the first-layer target features 302 as well as the second-layer target features 306 may be distributed with a pitch 312. It is recognized that periodic structures separated along the measurement direction may facilitate accurate positional measurements and thus accurate overlay measurements by providing multiple points of measurement associated with the multiple features separated by the known pitch 312. By way of another example, as also illustrated in FIG. 3, features in each layer may be segmented with a fine pitch 314. The fine pitch 314 may correspond to, but is not required to correspond to, a spatial frequency associated with corresponding device features for which the overlay metrology target 300 is designed to be representative of. It is recognized herein that overlay target features are typically designed to be substantially larger than the corresponding device features to be optically resolvable by a light-based overlay metrology tool. However, it is further recognized herein that fabrication characteristics associated with process steps (e.g., lithography steps, etching steps, or the like) may differ based on the size and/or density of features such that optically-resolvable overlay target features may exhibit systematic overlay errors. Accordingly, segmenting overlay target features with a fine pitch 314 representative of device-scale features may mitigate the associated systematic errors and facilitate accurate overlay measurements that are representative of the overlay of the corresponding device features.

For example, as illustrated in FIG. 3, the first-layer target features 302 and the second-layer target features 306 may be laterally offset from each other in a measurement direction (e.g., an X direction of FIG. 3) such that at least a portion of the first-layer target features 302 are visible through the second layer 308. Further, the first-layer target features 302 and the second-layer target features 306 may be laterally offset from each other in a direction orthogonal to the measurement direction (e.g., a Y direction of FIG. 3). In this regard, the first-layer target features 302 may be visible regardless of an overlay between the first layer 304 and the second layer 308. In this regard, the overlay between the first layer 304 and the second layer 308 may be determined by a deviation of the separation distances of the first-layer target features 302 from the second-layer target features 306 (e.g., along the X-direction) from an ideal separation distance associated with zero overlay error.

The positions of the target features in each layer (e.g., the first-layer target features 302 and the second-layer target features 306) and accordingly the relative positions of the target features on different layers may be determined using any positional metric known in the art. In one embodiment, positions of features on a layer are based on centers of symmetry of the features on the layer. For example, the first-layer target features 302 may include first-layer centers of symmetry 316 and the second-layer target features 306 may include second-layer centers of symmetry 318. Accordingly, overlay between the first layer 304 and the second layer 308 may be determined based on a comparison of the first-layer centers of symmetry 316 and the second-layer centers of symmetry 318. In another embodiment, positions of features on a layer are based on edge positions of the features. In this regard, overlay between the first layer 304 and the second layer 308 may be determined based on measured first-layer edge positions 320 and measured second-layer edge positions 322.

In another embodiment, images may be captured at any number of object planes 324 located at any depth in the sample 106. As described previously herein in the context of the overlay metrology system 100, the location of an object plane 324 with respect to the sample 106 may be adjusted through a variety of techniques such as, but not limited to, adjustments of the sample stage 116, the objective lens 114, the detector 118, and/or one or more collection optical elements 124. However, it is to be understood that the method 200 is not limited to the overlay metrology system 100. Accordingly, illustrations provided with respect to the overlay metrology system 100 are provided solely for illustrative purposes and should not be interpreted as limiting. In a general sense, locations of object planes 324 may be adjusted using any technique known in the art.

In one embodiment, the reference images generated in step 202 are generated during an automatic recipe optimization (ARO) metrology step. It is recognized herein that some metrology recipes include an ARO metrology step in which images are generated of the sample at multiple object planes to calibrate the metrology tool and/or prepare for measurements on the sample. Accordingly, the reference images associated with step 202 may be selected from the ARO through-focus images. In this regard, the impact of the step 202 on overlay measurement throughput may be minimal.

In another embodiment, the method 200 includes a step 204 of determining a reference overlay between two or more layers of the sample 106 at the overlay target based on the plurality of reference images. For example, the step 204 may include determining a reference overlay based on images captured at each layer of interest for an overlay measurement on the sample 106. In one instance, step 204 may include determining a reference overlay based on at least the first reference image and the second reference image.

FIG. 4 is a side view of the overlay metrology target 300 of FIG. 3 indicating multiple object planes 324 located at different depths in a sample 106, in accordance with one or more embodiments of the present disclosure. For example, the step 204 may include determining a reference overlay between the first layer 304 and the second layer 308 of the sample 106 based on an image of the first-layer target features 302 captured at object plane 324a and an image of the second-layer target features 306 captured at object plane 324b, where the images are captured in step 202. Further, though not shown, the step 204 may further include determining the reference overlay between the first layer 304 and the second layer 308 of the sample 106 based on additional images at additional object planes.

In this regard, the reference overlay measurement may include high-quality reference images at each object plane (e.g., object planes 324a and 324b). For example, the reference image of the first-layer target features 302 captured at object plane 324a may provide high image contrast between the first-layer target features 302 and surrounding material such that the positions of the first-layer target features 302 may be well-characterized. Similarly, reference image of the second-layer target features 306 captured at object plane 324b may provide high image contrast between the second-layer target features 306 and surrounding material such that the positions of the second-layer target features 306 may be well-characterized. Further, the positions of the features on each layer may be characterized based on any positional metric known in the art such as, but not limited to, centers of symmetry or edge positions of features on layers of interest.

In another embodiment, the method 200 includes a step 206 of selecting a measurement object plane for single-image overlay determination, where overlay between sample layers of interest (e.g., between the first layer 304 and the second layer 308 of FIG. 3, or between any number of sample layers) determined at the measurement plane corresponds to the reference overlay within a selected tolerance.

As described previously herein, performing multi-image overlay measurements at many overlay targets distributed across a sample 106 may negatively impact the overlay measurement throughput. Accordingly, step 206 may include selecting a measurement plane suitable for single-image overlay measurements that provides an accuracy comparable to the multi-image reference overlay measurement within a selected tolerance.

FIG. 5 is a side view of an overlay metrology target 300 indicating a measurement object plane 324c suitable for single-image overlay measurements, in accordance with one or more embodiments of the present disclosure.

The measurement object plane 324c may be selected using a variety of techniques. In one embodiment, a single-image overlay measurement is generated for a series of selected images generated in step 202 associated with a variety of object planes 324 at different depths in the sample 106. The selected images may include every image generated in step 202 or a subset of the images generated in step 202 (e.g., every other image, or the like). The overlay measured at each object plane 324 may then be compared to the reference overlay of step 204 based on the multi-image measurement. In this regard, the object plane 324 providing a single-image overlay measurement closest to the reference overlay may be selected as the measurement object plane 324c. In another embodiment, the measurement object plane 324c is selected based on an interpolation of multiple images generated in step 202. For example, it may be the case that a difference between single-image overlay measurements at each object plane 324 and the reference overlay measurement may exhibit an extremum (e.g., a maximum or a minimum) near a certain range of depths in the sample 106. Accordingly, the measurement object plane 324c may be selected to correspond to the extremum based on interpolation between nearby single-image overlay measurements.

In another embodiment, the measurement object plane 324c is selected through in iterative process. For example, in the case that the difference between single-image overlay measurements at each object plane 324 and the reference overlay measurement exhibits an extremum, additional reference images may be generated between measured object planes 324 to iteratively determine the measurement object plane 324c exhibiting an overlay value closest to the reference overlay value.

Further, as described previously herein, the overlay measured at the measurement object plane 324c need not exactly match the reference overlay measurement. Rather, the measurement object plane 324c may be selected to provide a single-image measurement with an accuracy within a selected tolerance of the multi-image reference overlay measurement. The selection of the measurement object plane 324c may further include considerations beyond a comparison of an overlay measurement value to the reference overlay. For example, the measurement object plane 324c may be selected to provide image quality characteristics (e.g., image contrast, resolution, aberrations, or the like) within selected tolerances.

In another embodiment, the method 200 includes a step 208 of generating at least one measurement image of at least one additional overlay target on the sample at the measurement plane.

Overlay metrology targets may be located at multiple sites on the semiconductor wafer. For example, overlay metrology targets may be located within scribe lines (e.g., between dies) and/or located in one or more dies across a sample. In this regard, overlay may be generated at multiple locations across the sample 106. For instance, one or more overlay targets may be associated with each exposure field associated with a lithography step (e.g., using a scanner, a stepper, or the like) to determine the overlay associated with the exposure fields. Further, multiple targets may be measured simultaneously or serially by the same or multiple metrology tools as described in U.S. Pat. No. 7,478,019, which is incorporated herein by reference in its entirety.

In another embodiment, the method 200 includes a step 210 of determining at least one measured overlay between sample layers of interest (e.g., the first layer 304 and the second layer 308 of FIG. 3, or any number of sample layers) at the at least one additional overlay target based on the at least one measurement image.

It is recognized herein that measuring overlay using a single-image technique at the measurement object plane 324c for multiple overlay targets may provide both high accuracy and high throughput overlay measurements. For example, measuring overlay using a single-image technique may provide a significant increase in overlay metrology throughput relative to multi-image overlay measurements. Further, selecting the measurement object plane 324c to provide an accurate overlay measurement based on direct comparison with a reference multi-image overlay measurement may provide an accuracy comparable to the multi-image reference overlay within a selected tolerance such that the increases in throughput may outweigh any accuracy reduction.

Measurement of overlay may involve a number of algorithms. For example, single-image overlay measurements may be modeled to determine and/or compensate for systematic errors associated with images generated by the overlay metrology system 100. For example, optical interaction of the illumination beam 104 with an overlay metrology target on the sample 106 may be, but is not required to be, modeled using an electro-magnetic (EM) solver. Further, the EM solver may utilize any method known in the art including, but not limited to, rigorous coupled-wave analysis (RCWA), finite element method analysis, method of moments analysis, a surface integral technique, a volume integral technique, or a finite-difference time-domain analysis. Additionally, collected data may be analyzed using data fitting and optimization techniques including, but not limited to libraries, fast-reduced-order models, regression, machine-learning algorithms such as neural networks, support-vector machines (SVM), dimensionality-reduction algorithms (e.g. principal component analysis (PCA), independent component analysis (ICA), local-linear embedding (LLE), and the like), sparse representation of data (e.g. Fourier or wavelet transforms, Kalman filters, algorithms to promote matching from same or different tool types, and the like). For example, data collection and/or fitting may be, but is not required to be, performed by the Signal Response Metrology (SRM) software product provided by KLA-TENCOR.

Raw data generated by an overlay metrology tool may also be analyzed by algorithms that do not include modeling, optimization and/or fitting. It is noted herein that computational algorithms performed by the controller 132 may be, but are not required to be, tailored for metrology applications through the use of parallelization, distributed computation, load-balancing, multi-service support, design and implementation of computational hardware, or dynamic load optimization. Further, various implementations of algorithms may be, but are not required to be, performed by the controller 132 (e.g. though firmware, software, or field-programmable gate arrays (FPGAs), and the like), or one or more programmable optical elements associated with the metrology tool. The use of process modeling is generally described in U.S. Patent Publication No. 2014/0172394, published on Jun. 19, 2014, which is incorporated herein by reference in its entirety.

In another embodiment, the method 200 includes generating overlay metrology recipes based on a selected overlay measurement plane. Overlay metrology tools are typically configurable according to a recipe including a set of measurement parameters utilized to generate an overlay signal and may include, but are not limited to, locations of overlay metrology targets on the sample 106 to characterize, a measurement plane at which to generate images, an illumination spectrum, a spot size for illumination of the sample 106, angles at which to illuminate the sample 106, a polarization of incident illumination, a position of a beam of incident illumination on an overlay target, or detection conditions (e.g., sample acquisition time, detector gain, or the like). Accordingly, an overlay recipe may include a set of configuration parameters for components of an overlay tool (e.g., illumination sources, imaging optics, sample stages, detection optics, detectors, or the like) as well as measurement parameters for generating an overlay signal. In some embodiments, the method 200 includes generating overlay recipes to perform one or more steps described above such as, but not limited to, generating reference images in step 202 and generating measurement images at the measurement object plane 324c for multiple overlay targets distributed throughout the sample 106 in step 202.

In another embodiment, the method 200 includes generating overlay correctables that may be provided to fabrication tools (e.g., lithography tools, metrology tools, or the like) as feedback and/or feedforward data. For example, overlay measurements associated step 210 based on the single-image overlay measurements at the measurement object plane 324c may be used as feedback data to compensate for drifts and maintain overlay within selected tolerances for the process step on subsequent samples in the same or subsequent lots. By way of another example, overlay measurements associated step 210 based on the single-image overlay measurements at the measurement object plane 324c may be fed-forward to adjust subsequent process steps (e.g., subsequent lithography steps, or the like) to compensate for any measured overlay errors.

In another embodiment, the method 200 includes monitoring intra-sample process variations based on variations of the single-image overlay measurements of step 210. For example, systematic location-dependent variations of measured overlay across the sample 106 may be indicative of intra-sample process variations. Accordingly, data associated with the intra-sample process variations may be used as feedback and/or feedforward data to correct and/or react to the process variations.

In another embodiment, the method 200 includes monitoring sample-to-sample process variations based on fluctuations of the optimal measurement plane. For example, a multi-image reference overlay may be generated on overlay targets located on multiple samples (e.g., on each sample in a lot, on selected samples in a lot, or the like). Further, an optimal measurement object plane 324c may be selected for each sample. In this regard, deviations of the optimal measurement object plane 324c between samples may be indicative of sample-to-sample process variations. Accordingly, data associated with these sample-to-sample process variations may be used as feedback and/or feedforward data to correct and/or react to the process variations.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A metrology system comprising:
a controller communicatively coupled to a detector configured to generate images of a sample based on the light captured by an objective lens, wherein an object plane of the detector with respect to the sample is adjustable, the controller including one or more processors configured to execute program instructions causing the one or more processors to:
    direct the detector to generate a plurality of reference images of an overlay target on the sample at a plurality of object planes at different depths of the sample, wherein the plurality of reference images include at least a first reference image at a first object plane corresponding to a first layer of the sample at a first depth including overlay target features on the first layer and a second reference image at a second object plane corresponding to a second layer of the sample at a second depth including overlay target features on the second layer;
    determine a reference overlay between the first layer and the second layer at the overlay target based on at least the first reference image and the second reference image;
    select a measurement object plane for single-image overlay determination based on at least the first reference image and the second reference image, wherein overlay between the first layer and the second layer determined at the measurement plane corresponds to the reference overlay within a selected tolerance;
    direct the detector to generate at least one measurement image of at least one additional overlay target on the sample at the measurement plane; and
    determine at least one measured overlay between the first layer and the second layer at the at least one additional overlay target based on the at least one measurement image.

2. The metrology system of claim 1, wherein the one or more processors are further configured to execute program instructions causing the one or more processors to:
detect defects on the at least one additional overlay target.

3. The metrology system of claim 1, wherein determining the reference overlay between the first layer and the second layer at the overlay target based on the first reference image and the second reference image comprises:
    determining a first center of symmetry of features in the first layer based on the first reference image;
    determining a second center of symmetry of features in the second layer based on the second reference image; and
    subtracting the first center of symmetry and the second center of symmetry.

4. The metrology system of claim 1, wherein determining at least one measured overlay between the first layer and the second layer at the at least one additional overlay target based on the at least one measurement image comprises:
    determining a first center of symmetry of features in the first layer based on the measurement image;
    determining a second center of symmetry of features in the second layer based on the measurement image; and
    subtracting the first center of symmetry and the second center of symmetry.

5. The metrology system of claim 1, wherein the measurement object plane is between the first object plane and the second object plane.

6. The metrology system of claim 1, wherein the measurement object plane includes at least one of the first object plane or the second object plane.

7. The metrology system of claim 1, further comprising:
a sample stage configured to secure the sample, wherein the object plane of the detector with respect to the sample is adjustable by controlling a position of the sample stage.

8. The metrology system of claim 1, wherein the object plane of the detector with respect to the sample is adjustable by controlling a position of at least one of the detector or the objective lens.

9. The metrology system of claim 2, wherein the one or more processors are further configured to execute program instructions causing the one or more processors to:
    monitor process variations based on the detected defects on the at least one additional overlay target.

10. The metrology system of claim 9, wherein the sample is a first sample, wherein the one or more processors are further configured to execute program instructions causing the one or more processors to:
    direct the detector to generate a plurality of reference images of an overlay target on a second sample at a plurality of object planes, wherein the plurality of reference images include at least a first reference image at a first object plane corresponding to a location of overlay target features on a first layer of the second sample and a second reference image at a second object plane corresponding to a location of overlay target features on a second layer of the second sample;
    determine a second reference overlay between the first layer and the second layer at the overlay target on the second sample based on at least the first reference image and the second reference image associated with the second sample;
    select a second measurement object plane for single-image overlay determination for the second sample, wherein overlay between the first layer and the second layer determined at the at least one additional measurement plane corresponds to the reference overlay within the selected tolerance;
    direct the detector to generate at least one measurement image of at least one additional overlay target on the second sample at the measurement plane; and
    determine at least one measured overlay between the first layer and the second layer of the second sample at the at least one additional overlay target based on the at least one measurement image.

11. The metrology system of claim 10, wherein the one or more processors are further configured to execute program instructions causing the one or more processors to:
    detect defects on the at least one additional overlay target on the second sample.

12. The metrology system of claim 11, wherein the one or more processors are further configured to execute program instructions causing the one or more processors to:
    monitor wafer to wafer process variations based on the detected defects on the first sample and the second sample.

13. A metrology system comprising:
an illumination source configured to generate an illumination beam;

an objective lens configured to direct the illumination beam to a sample and further configured to capture light from the sample in response to the illumination beam;

a detector configured to generate images of the sample based on the light captured by the objective lens, wherein an object plane of the detector with respect to the sample is adjustable; and a controller communicatively coupled to the detector, the controller including one or more processors configured to execute program instructions causing the one or more processors to:

direct the detector to generate a plurality of reference images of an overlay target on the sample at a plurality of object planes at different depths of the sample, wherein the plurality of reference images include at least a first reference image at a first object plane corresponding to a first layer of the sample at a first depth including overlay target features on the first layer and a second reference image at a second object plane corresponding to a second layer of the sample at a second depth including overlay target features on the second layer;

determine a reference overlay between the first layer and the second layer at the overlay target based on at least the first reference image and the second reference image;

select a measurement object plane for single-image overlay determination based on at least the first reference image and the second reference image, wherein overlay between the first layer and the second layer determined at the measurement plane corresponds to the reference overlay within a selected tolerance;

direct the detector to generate at least one measurement image of at least one additional overlay target on the sample at the measurement plane; and determine at least one measured overlay between the first layer and the second layer at the at least one additional overlay target based on the at least one measurement image.

14. The metrology system of claim 13, wherein the one or more processors are further configured to execute program instructions causing the one or more processors to:
detect defects on the at least one additional overlay target.

15. The metrology system of claim 13, wherein determining the reference overlay between the first layer and the second layer at the overlay target based on the first reference image and the second reference image comprises:
determining a first center of symmetry of features in the first layer based on the first reference image;
determining a second center of symmetry of features in the second layer based on the second reference image; and
subtracting the first center of symmetry and the second center of symmetry.

16. The metrology system of claim 13, wherein determining at least one measured overlay between the first layer and the second layer at the at least one additional overlay target based on the at least one measurement image comprises:
determining a first center of symmetry of features in the first layer based on the measurement image;
determining a second center of symmetry of features in the second layer based on the measurement image; and
subtracting the first center of symmetry and the second center of symmetry.

17. The metrology system of claim 13, wherein the measurement object plane is between the first object plane and the second object plane.

18. The metrology system of claim 13, wherein the measurement object plane includes at least one of the first object plane or the second object plane.

19. The metrology system of claim 13, further comprising:
a sample stage configured to secure the sample, wherein the object plane of the detector with respect to the sample is adjustable by controlling a position of the sample stage.

20. The metrology system of claim 13, wherein the object plane of the detector with respect to the sample is adjustable by controlling a position of at least one of the detector or the objective lens.

21. The metrology system of claim 14, wherein the one or more processors are further configured to execute program instructions causing the one or more processors to:
monitor process variations based on the detected defects on the at least one additional overlay target.

22. The metrology system of claim 21, wherein the sample is a first sample, wherein the one or more processors are further configured to execute program instructions causing the one or more processors to:
direct the detector to generate a plurality of reference images of an overlay target on a second sample at a plurality of object planes, wherein the plurality of reference images include at least a first reference image at a first object plane corresponding to a location of overlay target features on a first layer of the second sample and a second reference image at a second object plane corresponding to a location of overlay target features on a second layer of the second sample;
determine a second reference overlay between the first layer and the second layer at the overlay target on the second sample based on the first reference image and the second reference image associated with the second sample;
select a second measurement object plane for single-image overlay determination for the second sample, wherein overlay between the first layer and the second layer determined at the at least one additional measurement plane corresponds to the reference overlay within the selected tolerance;
direct the detector to generate at least one measurement image of at least one additional overlay target on the second sample at the measurement plane; and
determine at least one measured overlay between the first layer and the second layer of the second sample at the at least one additional overlay target based on the at least one measurement image.

23. The metrology system of claim 22, wherein the one or more processors are further configured to execute program instructions causing the one or more processors to:
detect defects on the at least one additional overlay target on the second sample.

24. The metrology system of claim 23, wherein the one or more processors are further configured to execute program instructions causing the one or more processors to:
monitor wafer to wafer process variations based on the detected defects on first sample and the second sample.

25. The method for measuring overlay comprising:
generating a plurality of reference images of an overlay target on a sample at a plurality of object planes at different depths of the sample, wherein the plurality of reference images include reference images corresponding to two or more of the plurality of object planes at two or more depths of the sample including overlay target features on two or more layers of the sample;

determining a reference overlay between the two or more layers of the sample based on the plurality of reference images;

selecting a measurement object plane for single-image overlay determination based on the plurality of reference images, wherein overlay between the two or more layers of the sample corresponds to the reference overlay within a selected tolerance;

generating at least one measurement image of at least one additional overlay target on the sample at the measurement plane; and determining at least one measured overlay between the two or more layers of the sample at the at least one additional overlay target based on the at least one measurement image.

* * * * *